United States Patent [19]

Tanaka et al.

[11] Patent Number: 4,970,088
[45] Date of Patent: Nov. 13, 1990

[54] LIQUID FOOD FOR SUPPLYING PROTEIN

[75] Inventors: Yoshinaru Tanaka, Kawagoe; Sadaaki Iwamura, Tokyo; Naoko Sugiura, Tokyo; Hiromoto Asai, Nagoya; Tadashi Kurachi, Konan; Masayasu Kurono, Mie; Bunichiro Yasui, Nagoya; Kiichi Sawai, Funabashi, all of Japan

[73] Assignees: Nipon Oils & Fats Co., Ltd., Tokyo; Sawa Chemical Laboratory Co., Ltd., Aichi, both of Japan

[21] Appl. No.: 427,276

[22] Filed: Oct. 24, 1989

[30] Foreign Application Priority Data

Nov. 29, 1988 [JP] Japan ................. 63-299605

[51] Int. Cl.$^5$ ............ A23C 21/00; A23J 3/08
[52] U.S. Cl. .................. 426/583; 426/580; 426/657; 426/800; 426/801
[58] Field of Search ........... 426/657, 801, 800, 580, 426/583

[56] References Cited

U.S. PATENT DOCUMENTS 3,922,375  11/1975  Dalan et al. ................. 426/583

FOREIGN PATENT DOCUMENTS 0019415  11/1980  European Pat. Off. ............ 426/583
0311795   4/1989  European Pat. Off. ............ 426/583
 966857   8/1964  United Kingdom ............... 426/583
1031622   5/1978  United Kingdom ............... 426/583

OTHER PUBLICATIONS

Borden, Protolac. Industrial Foods Product, Borden Foods, Div. of Borden, Inc., 50 West Broad St., Columbus, Ohio 43215.

*Primary Examiner*—Donald E. Czaja
*Assistant Examiner*—Helen Pratt
*Attorney, Agent, or Firm*—Browdy and Neimark

[57] ABSTRACT

The invention is a liquid food for supplying protein principally containing protein, seasonings, flavoring materials and water, wherein it contains 5 to 15% by weight of lactalbumin as the protein. The lactalbumin is obtained by heating to denature under conditions so as to form a cloudy solution. The food is useful for undernourished patients who suffer from hypoproteinemia, hypoalbuminemia or common healthy men who need protein so as to desire to supply nutritious food and develop their muscles.

1 Claim, No Drawings

LIQUID FOOD FOR SUPPLYING PROTEIN

BACKGROUND OF THE INVENTION

The present invention relates to liquid food for supplying protein which is easily and safely provided for undernourished patients who suffer from hypoproteinemia, hypoalbuminemia and the like or common healthy men who desire to supply nutritious food and develop their muscles.

Protein is an important nutritive element as an ingredient of body constitutions. People need to consume much protein for developing physical strength or for preventing complications.

However, when protein is supplied by using common foodstuffs to a patient who should take much protein, for example, a patient who suffers from a liver complaint, a patient who needs dialysis of the kidney, etc., he becomes fat or suffers from fatty liver. Accordingly, it is difficult to cure the hypoalbuminemia. Then, in order to efficiently ingest protein only, food for supplying protein has been used in the form of protein materials which can be added to daily meals. On the other hand, a plasma agent is used for a patient who suffers from hypoproteinemia. However, it becomes difficult to use the agent because the agent has many troubles, so that it is important to use the food for supplying good quality protein.

For the present, several kinds of food for supplying protein such as, for example, milk protein, soybean protein, egg protein or a mixture thereof are available on the market, and most of the food is powder.

The food for supplying protein is prepared by dissolving the powder in water, milk, juice, etc. or by mixing in dessert such as, for example, a jelly or custard pudding, or in a meal for giving to a patient.

In such a case, the powdered food has the following problems.

(a) It is apt to become unsanitary.

(b) When it is dissolved in water, many bubbles are formed. It is difficult to break and remove the bubbles and these operation steps are troublesome.

(c) As the solution of the powder food is apt to be contaminated by bacteria, the solution must be used within a few hours.

For the above reason, it is desired to obtain the liquid food for supplying protein usable as it is.

Furthermore, the protein used in the above liquid food should be highly nutritious. The nutritive value of the protein is determinerd by the kinds of amino acid and quantity thereof which constitute the protein. Protein scores are used for evaluating the nutritive value. As the protein scores of several kinds of protein, lactalbumin: 100, egg protein: 100, casein: 91, soybean protein: 60 are exemplified. From these scores, it is understood that the lactalbumin and the egg protein are highly nutritious.

The liquid food for supplying protein is prepared by liquidizing and sterilizing protein. However, when the lactalbumin and the egg protein are especially used, the protein is denatured by heating on sterilization treatment and the protein is coagulated and precipitated. In conventional methods, it is difficult to produce the liquid food for supplying protein having prolonged stability by using highly nutritious lactalbumin or egg protein.

Moreover, as the liquid food for supplying protein is used for oral administation in many cases, it should be tasty. However, protein such as, for example, albumin or casein or a degradation product thereof tastes rough and bitter, and it changes color remarkably after sterilizing. As a result, it is difficult to use the above conventional liquid food as an oral product.

As described above, there are problems that the production of the highly nutritious liquid food which is tasteful and can supply with protein is difficult.

SUMMARY OF THE INVENTION

The present inventors have earnestly strived to resolve these problems. As a result, the inventors devised liquid food for supplying protein which is highly nutritious and tasteful by using lactalbumin as the protein which is obtained by lactalbumin heated in water at a temperature of from 60°-100° C. to obtain a cloudy solution containing the denatured protein.

Namely, the present invention comprises a liquid food for supplying protein principally containing protein, seasonings, flavor materials and water, wherein it contains 5 to 15% by weight of lactalbumin as the said protein, the said lactalbumine being heated in water at a temperature of from 60°-100° C. to obtain a cloudy solution containing the denatured protein.

DETAILED DESCRIPTION OF THE INVENTION

The present invention provides the protein for patients who suffer from hypoproteinemia and the like or average healthy men, and the protein is contained in the liquid food for supplying protein which can be provided conveniently and stably. Accordingly, the protein to be used in accordance with the present invention has preferably a protein score of 100 of nutritive value. For these reasons, lactalbumin or egg protein is used. However, the protein is flocculated in the heat treatment for sterilizing. The lactalbumin which is obtained by heating to denature in cloudy conditions is, then, used in accordance with the present invention. The lactalbumin which is obtained by heating to denature in cloudy conditions can be prepared by the following treatment steps.

Lactalbumin is dissolved in water preferably at 50° C. or less, and the obtained solution is heated at temperatures of 60° to 100° C., preferably 70° to 85° C. obtain a cloudy solution containing the denatured protein. Many kinds of products which contains pure lactalbumin come into the market, but the lactalbumin to be used in accordance with the present invention has preferably the purity of 90% or more. When the lactalbumin having the purity of less than 90% is used, it is coagulated by heating.

The content of the lactalbumin denatured by heating to be used in accordance with the present invention is from 5 to 15% by weight and the lactalbumin can be used in combination with other proteins. As the other proteins, egg protein, milk protein, soybean protein, wheat protein, fish protein, meat protein, gelatin, these degradation products and the like can be exemplified and can be used in combination with one or more kinds of the above protein so as not to reduce the nutulitive qualities, preferably in combination with casein which is heat-stable. The content of the protein to be used in accordance with the present invention is from 5 to 15% by weight. When the content is less than 5% by weight, no sufficient amount of the protein can be provided.

When the content is more than 15% by weight, the production of the liquid food becomes difficult.

The food of the present invention can be supplied, if necessary, by adding several kinds of vitamins and minerals together with protein. When the liquid food should be orally administered without being disagreeable to drink, the right proportion of sweetening materials, fruit juice, spices and the like can be added. As the sweetening materials, cane sugar which is little browned by heating in a solution can be preferably used and it can be combined with chemical synthetic materials such as, for example Stevioside, Aspartame, Glycyrrhizin etc. Phosphates, emulsifiers and the like can be used for dissolving, dispersing and stabilizing the protein.

The liquid food for supplying protein of the present invention is prepared by dissolving lactalbumin, preferably, in water at 50° C. or less, and then by heating the dissolved solution at 60° to 100° C., preferably at 70° to 85° C. to obtain a cloudy aqueous solution. Protein other than lactalbumin, seasonings, flavors and the like are dissolved in the prepared solution, the obtained solution is sterilized at high temperatures of 100° to 150° C. and the sterilized solution is charged into a vessel. As the sterilizing means, a common sterilizer such as, for example, a retort or an ultrahigh temperature sterilizer can be used. The sterilization conducted by using an ultrahigh temperature instantaneous heater which is of the indirect heating type or of the direct steam heating type is preferably employed. After the sterilization or before the sterilization, the food can be homogenized, if neccesary.

By using lactalbumin which is obtained by heating lactalbumin to denature in cloudy conditions, the protein can be protected from aggregation by heat treatment in the preparing of the liquid food, and the liquid food for supplying protein can contain the lactalbumin having high nutritive value. Accordingly, the food of the present invention is characterized in that it has high nutritive value and liquefied conditions and has the following advantages.

(a) As the food is liquid, it is unnecessary to dissolve it in a solution and it can be provided as it is without any treatment. It can be easily mixed with milk or concentrated liquid food.

(b) After sterilizing the food, it can be preserved in a long term as it is, and no separation, precipitation or aggregation of the contents of the food is observed.

(c) For the patients who suffer from hypoproteinemia or hypoalbuminemia and common healthy people who need protein, the food which contains protein having good quality can be sufficiently and easily given so as to improve their nutrition.

DESCRIPTION OF PREFERRED EMBODIMENTS

The following examples illustrate the present invention more specifically. In these Examples, % is expressed by weight.

EXAMPLE 1

The food containing constituents as shown in Table 1 is prepared. Firstly, lactalbumin was added to water and dissolved, and then the dissolved liquid was heated at a temperature of 75° C. by means of a heat exchanger of plate type. The dissolved liquid was changed by heating from transparent to opaque and cloudy. Each remaining substance was added and dissolved in the cloudy liquid. The obtained liquid was treated to homogenize at a temperature of about 60° C. at a homogenizing pressure of 50 kg/cm$^2$. The homogenized liquid was treated by means of an ultrahigh temperature instantaneous heat sterilizer which is indirect heating type, at a temperature of 135° C. for 12 seconds, then at a temperature of 70° C. at a homogenizing pressure of 100 kg/cm$^2$, then the liquid was cooled to 20° C. and charged in a sterilized vessel to obtain the liquid food for supplying protein. The obtained liquid food had a viscosity of 12 cp (at 20° C.), a protein content of 10% and a protein score of 100, it was flavorful and could be used for supplying protein which had good quality. After the liquid food for supplying protein was allowed to stand over a preiod of six months at room temperature, no precipitate was observed, and the stability of the food was good.

TABLE 1

| Substance | Amount (kg) |
| --- | --- |
| Lactalbumin (purity 95%) | 7.37 |
| Sodium caseinate | 3.23 |
| Cane sugar | 6.00 |
| Stevioside | 0.001 |
| Glycyrrhizin | 0.001 |
| Cream flavor | 0.6 |
| Vitamin A | 0.007 |
| Vitamin B$_1$ | 0.001 |
| Water | 82.790 |

EXAMPLE 2

The food having constituents as shown in Table 2 was prepared. Firstly, lactalbumin was added to water and dissolved. The vessel containing the dissolved liquid was heated at a temperature of 80° C. for 15 minutes by supplying steam into the jacket of the vessel. The heated liquid changed from transparent to cloudy. Each remaining substance was added to the cloudy liquid. The obtained liquid cooled to 65° C. was treated at a homogenization pressure of 100 kg/cm$^2$ so as to obtain homogenized liquid. The homogenized liquid was charged into each can having a volume of 200 cc, each can was sealed and quickly retort-sterilized at 128° C. for 7 minutes in an autoclave, and the liquid food for supplying protein was obtained. The liquid food had a viscosity of 8 cp (at 20° C.), a protein content of 5.5% and a protein score of 100, and could be used for supplying protein which had good quality. After the liquid food for supplying protein was allowed to stand over a preiod of six months at room temperature, no precipitate was observed, and the stability of the food was good.

TABLE 2

| Substance | Amount (kg) |
| --- | --- |
| Lactalbumin (purity 90%) | 6.1 |
| Cane sugar | 3.0 |
| Honey | 2.0 |
| Milk flavor | 0.4 |
| Vitamin A | 0.007 |
| Vitamin B$_2$ | 0.001 |
| Water | 88.492 |

EXAMPLE 3

The food having constituents as shown in Table 3 was prepared. Firstly, lactalbumin was added to water and dissolved, and then the dissolved liquid was heated at a temperature of 80° C. by means of a heat exchanger of the plate type. The dissolved liquid changed from transparent to cloudy. Each remaining substance was added to the cloudy liquid. The obtained liquid was treated to homogenize at a temperature of about 70° C. at a homogenizing pressure of 200 kg/cm². The homogenized liquid was treated by means of an ultrahigh temperature instantaneous heat sterilizer which is direct steam heat type, at a temperature of 140° C. for 4 seconds, then at a temperature of 70° C. at a homogenizing pressure of 50 kg/cm², and the liquid was cooled to 20° C. and charged in a sterilized vessel to obtain the liquid food for supplying protein. The obtained liquid food had a viscosity of 15 cp (at 20° C.), a protein content of 14% and a protein score of 100. It could be used for supplying protein which had good quality. After the liquid food for supplying protein was allowed to stand over a preiod of six months at room temperature, no precipitate was observed, and the stability of the food was good.

TABLE 3

| Substance | Amount (kg) |
| --- | --- |
| Lactalbumin (purity 95%) | 6.3 |
| Decomposition product of casein | 4.3 |
| Decomposition product of albumen | 4.0 |
| Cane sugar | 5.5 |
| Sodium hexametaphosphate | 0.1 |
| Yogurt flavor | 0.5 |
| Calcium chloride | 0.2 |

TABLE 3-continued

| Substance | Amount (kg) |
| --- | --- |
| Water | 79.1 |

COMPARATIVE EXAMPLES 1, 2 AND 3

Using the same treatment process as used in Examples 1, 2 and 3 except that undenatured lactalbumin was used instead of the denatured cloudy lactalbumin, the solution of the undenatured lactalbumin was treated. The obtained liquid was solidified by the sterilization step in each comparative example.

COMPARATIVE EXAMPLE 4

Using the same amounts of Table 1 as shown in Example 1 except that the amount of lactalbumin (purity 95%) was changed to 16.0 kg and the amount of water was changed to 74.16 kg, firstly, lactalbumin was added to water and dissolved. The dissolved liquid was heated by means of a heat exchanger of plate type at 75° C. and solidified food was obtained.

What is claimed is:

1. A liquid food for supplying protein principally containing protein, seasonings, flavoring materials and water, wherein it contains 5 to 15% by weight of lactalbumin as said protein, the said lactalbumin being prepared by heating lactalbumin having a purity of at least 90% in water at a temperature of from 60°–100° C. to obtain a cloudy solution containing the denatured lactalbumin.

* * * * *

UNITED STATES PATENT AND TRADEMARK OFFICE
CERTIFICATE OF CORRECTION

PATENT NO. : 4,970,088

DATED : November 13, 1990

INVENTOR(S) : TANAKA et al.

It is certified that error appears in the above-identified patent and that said Letters Patent is hereby corrected as shown below: On the title page:

| | |
|---|---|
| [75] Inventors: | Delete "Yoshinaru Tanaka", insert therefor -- Yoshiharu Tanaka -- |
| [73] Assignees: | Delete "Nipon Oils & Fats Co., Ltd.", insert therefor -- Nippon Oil & Fats Co., Ltd. -- |
| | Delete "Sawa Chemical Laboratory Co., Ltd.", insert therefor -- Sanwa Chemical Laboratory Co., Ltd. -- |
| Column 2, line 16 | Delete "by lactalbumin heated in", insert therefor -- by heating lactalbumin in -- |
| Column 2, line 21 | Delete "seasonings, flavor materials", insert therefor -- seasonings, flavoring materials -- |
| Column 2, line 23 | Delete "lactalbumine", insert therefor -- lactalbumin -- |
| Column 4, line 15 | Delete "preiod", insert therefor -- period -- |
| Column 4, line 50 | Delete "preiod", insert therefor -- period -- |

UNITED STATES PATENT AND TRADEMARK OFFICE
CERTIFICATE OF CORRECTION

PATENT NO. : 4,970,088

DATED : November 13, 1990

INVENTOR(S) : Tanaka, et al

It is certified that error appears in the above-identified patent and that said Letters Patent is hereby corrected as shown below:

Column 5, line 20     Delete "preiod", insert therefor -- period --

Column 6, line 21     Delete "exchanger of plate type", insert therefor -- exchanger of the plate type --

Signed and Sealed this

Nineteenth Day of January, 1993

Attest:

DOUGLAS B. COMER

*Attesting Officer*     Acting Commissioner of Patents and Trademarks